Oct. 13, 1970     P. H. H. BISHOP     3,533,274
APPARATUS AND METHOD FOR DETERMINING THERMAL CONDUCTIVITY
Filed March 20, 1967     3 Sheets-Sheet 1

INVENTORS
PETER HAROLD H. BISHOP
KENNETH FRANCIS ROGERS

BY Cushman, Darby & Cushman
ATTORNEYS

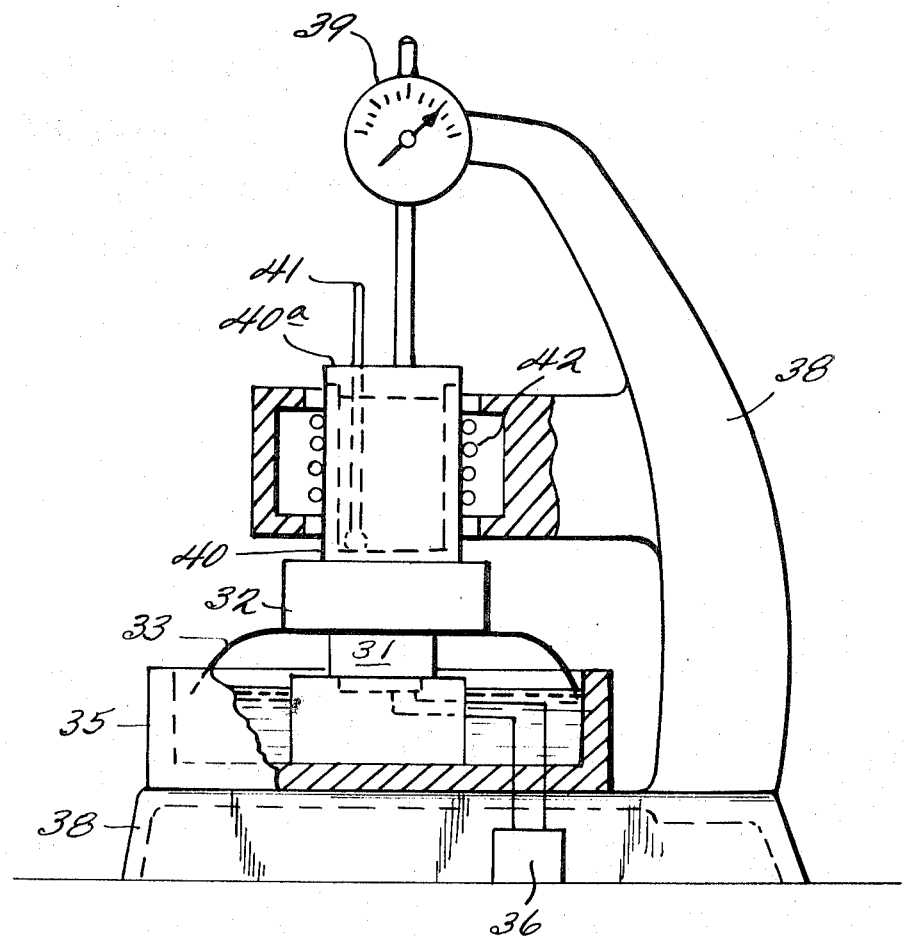

United States Patent Office 3,533,274
Patented Oct. 13, 1970

3,533,274
APPARATUS AND METHOD FOR DETERMINING THERMAL CONDUCTIVITY
Peter Harold Howard Bishop, 9 Woodbourne, Weybourne, Farnham, Surrey, England, and Kenneth Francis Rogers, Russets, Ash Green Road, Ash Green, Aldershot, Hampshire, England
Filed Mar. 20, 1967, Ser. No. 624,528
Claims priority, application Great Britain, Mar. 21, 1966, 12,289/66
Int. Cl. G01n 25/18
U.S. Cl. 73—15
3 Claims

ABSTRACT OF THE DISCLOSURE

The invention relates to measuring the heat conductivity of a specimen by causing heat to flow along a path which includes the specimen, determining the temperatures at stations along the path and deriving the conductivity from these temperatures and the known constants of the path. The invention consists in a process and in apparatus for using a surface layer of a material—e.g. paraffin wax—of known melting point extending across the path at one of said stations to determine the temperature there, the test being taken when the wax is just beginning or just ceasing to melt. The wax may be a layer of adhesive between the specimen and a datum block of known conductivity or it may be a slab which is itself the datum block.

---

Figure 1:
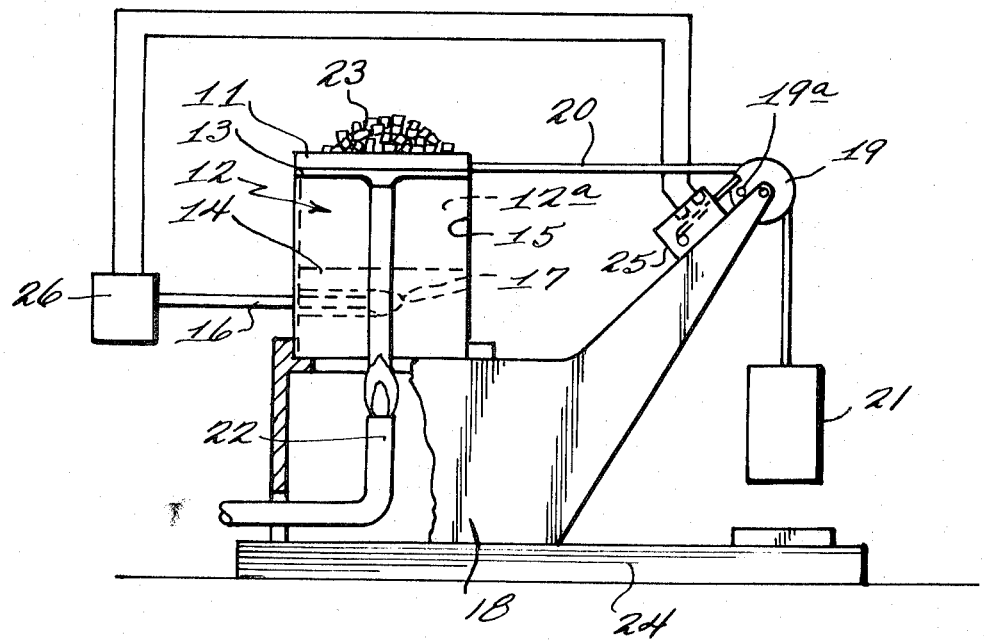

Known comparative tests for measuring the thermal conductivity of a specimen include the use of thermocouples, and to obtain both accuracy and repeatability, they need considerable time and the use of expensive apparatus—with essential parts shielded to guard against errors due to ambient temperature conditions—without giving a direct reading of conductivity. By contrast, the present invention allows of a direct reading—obviating the need for calculations—by the use of simple and inexpensive apparatus.

If heat flows along a known path which includes a specimen under test, and a datum block of known thermal conductivity in sequence, the thermal conductivity of the specimen can be determined from the temperatures at the ends of and at a known intermediate position along the path. An essential feature of the present invention is the step of predetermining the temperature at said intermediate position. Broadly, the present invention consists firstly in a method wherein a surface layer of material of known melting point is provided across the heat path at said intermediate position and the test is made when said material is changing state—i.e. beginning or ceasing to melt; the invention consists secondly in apparatus for use in measuring by such method.

If the heat passes in succession through a datum block—i.e. a block of known length of material of known conductivity—and a specimen which together form a composite block, the thermal conductivity of the specimen can be found from the proportions of the block, the conductivity of the datum and the temperatures at three sections of the block—which may conveniently be the ends and the interface between specimens and datum. Direct measurement of the interface or other intermediate temperature—e.g. by a thermocouple—is often difficult. Thus the present invention consists furthermore in a process using this principle of heat flow through a composite block but with a layer of meltable material of known melting temperature at the interface; the other factors are then determined at the point when the material at the interface is changing state. The invention furthermore consists in apparatus for carrying out processes as aforesaid.

It can be shown that if the specimen and datum block have faces in confrontation joined by the meltable layer and a temperature difference be applied between the outer faces of the composite block so formed, to create heat flow across the interface, then, provided the composite block is sufficiently wide, the heat flow through the specimen can, for all practical purposes, be taken as equal to the heat flow through the datum block. With the datum block at the hot end, this may be expressed as:

$$\frac{k_\text{s}}{l_\text{s}}(T_\text{M}-T_\text{C}) = \frac{k_\text{c}}{l_\text{c}}(T_\text{H}-T_\text{M})$$

where
$k_\text{s}$=thermal conductivity of the specimen
$k_\text{c}$=thermal conductivity of the datum member
$l_\text{s}$=thickness of specimen
$l_\text{c}$=thickness of datum member
$T_\text{H}$=hot face temperature of datum member
$T_\text{M}$=temperature of adhesive
$T_\text{C}$=cold face temperature of specimen.

By using a datum member of constant thickness and known thermal conductivity, keeping $T_\text{C}$ at a known value, and progressively increasing $T_\text{H}$, the equation can be solved if the value of $T_\text{H}$ at which the layer begins to melt is noted. The temperature $T_\text{H}$ is proportional to $k_\text{s}/l_\text{s}$ and so an instrument measuring $T_\text{H}$ can be calibrated to give a direct reading of the value $k_\text{s}$ for a specimen of given thickness.

The temperatures $T_\text{H}$ and $T_\text{C}$ may however be constant and the thickness $l_\text{c}$ variable if the meltable material be used as the datum material in a manner hereinafter set forth in more detail, the material being in a slab which melts away at the interface until, by change of thickness, the interface cools down to the temperature at which melting ceases. The above equation can then be solved if at this point the thickness of the slab be known. The instrument showing thickness $l_\text{c}$ can again be calibrated to give a direct reading of the value of $k_\text{s}/l_\text{s}$.

Figure 2:
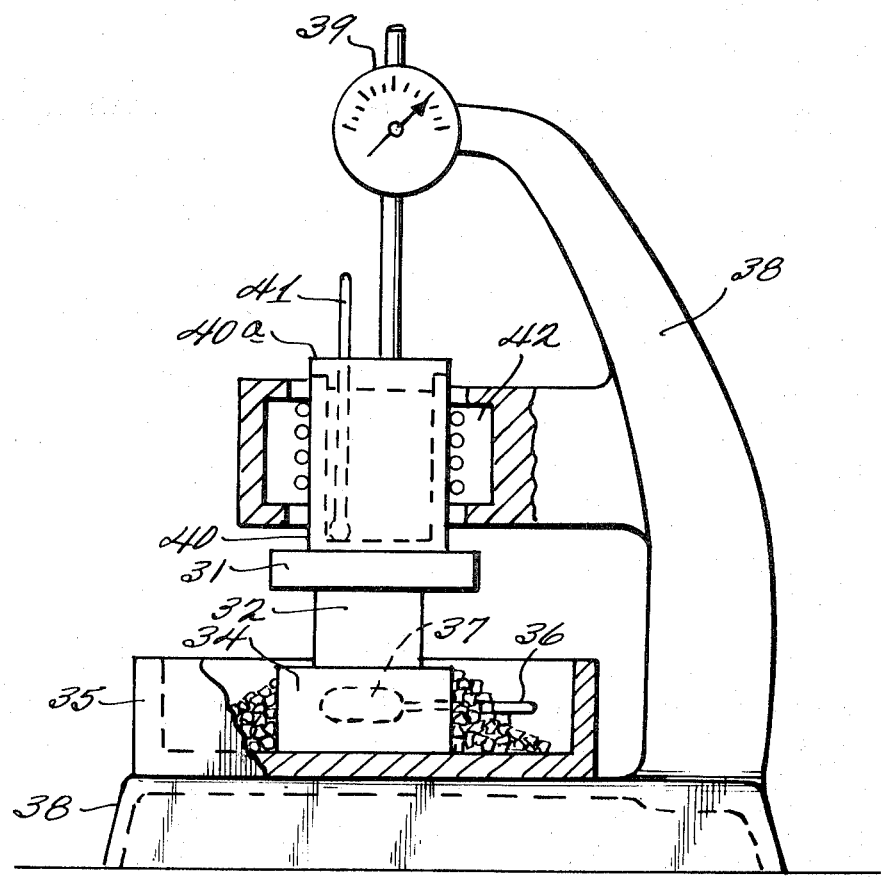

Two forms of the invention are illustrated by way of example in the accompanying drawings FIGS. 1, 2 and 3.

As shown in FIG. 1, a specimen 11 of unknown thermal conductivity but of known thickness is stuck by a thin layer of paraffin wax 13 to a silica member 12a of a datum block 12. The wax is melted whilst the specimen 11 and datum block 12 are pressed towards each other in any convenient manner and the wax is then allowed to set to secure adhesion. The datum block 12 incorporates the high conductivity copper block 14 supported in face to face contiguous relationship with member 12a, the two being held together by a metal case 15 wrapped around them. Temperature measuring means 16 have the sensitive end 17 in the copper block 14. The composite block 11–12–13 is supported on the base 18a of a bracket 18 which also supports a pulley wheel 19. A cord 20 is secured to the specimen 11 and extends over the pulley to a weight 21 which applies a shear load to the wax layer. A tappet 19a on the wheel 19 can engage a switch 25 connected to the electrical means 26 for recording a reading of means 16. A heat source 22 of any kind provides heat for raising the temperature of the datum block 12 and ice 23 on top of the specimen maintains its free face at a generally constant known low temperature $T_\text{C}$ which can be checked by a thermometer. The entire apparatus stands upon a flat metal base plate 24.

In operation, the copper block 14 and hence the whole datum block 12 are heated by the heat source 22, raising the temperature $T_\text{H}$ of the lower end of datum block 12 until the wax layer 13 has reached its melting temperature $T_\text{M}$, when the change of state of the wax is detected by failure in shear at the interface between the datum block 12 and the specimen 11 under the pull in cord 20 due to weight 21. When this takes place the temperature $T_H$ is recorded from the means 16 by the recorder 26 actuated by closure of switch 25 by movement of wheel 19. The metal case 15 serves to conduct heat to melt the wax at the periphery of the specimen and ensures that cold ambient conditions do not cause the wax to stick the specimen around the edges. As the thickness $l_c$ and the thermal conductivity $k_c$ of the silica in the datum block are known it follows that the means 16 and 26 can be calibrated as aforesaid to give the conductivity of the specimen directly.

The conductivity of block 14 is so high that the effective length and conductivity of the whole datum block 12 can be taken as that of the silica part 12a. The block 14 serves only as a heat-conducting lower face of the datum block and holder for the temperature measuring means 16. Alternative means for measuring the hot face temperature of the datum block may be used and may for example depend on the change in electrical resistance of a platinum coating with change in temperature.

The method is applied to the control of manufacture by being used to test specimen products of a manufacturing process or specimens of raw material to which the process is applied.

It has been found in practice that the repeatability of results obtained is enhanced if the layer 13 of adhesive be arranged to be fairly thick, say of the order of 0.010 inch. A pressure of less than about 5 grams per square centimetre pressure used to join the specimen, adhesive and datum block gives an adhesive thickness of at least 0.010 inch. An allowance should be made in the calculations for this thickness and the thermal conductivity of the adhesive layer, which allowance may be reduced or eliminated by the conclusion of aluminium powder or other high conductivity powder in the adhesive to raise its thermal conductivity.

In the alternatives shown in FIGS. 2 and 3 the specimen 31 abuts against a slab 32 of paraffin wax serving as both the datum member and the meltable layer at the interface. The lower member—in FIG. 2 the wax 32 and in FIG. 3 the specimen 31—rests on a support block 34 in a vessel 35 supported on the base of a bracket 38. Temperature measuring means 36 are supported with the sensitive end 37 in the block 34. Bearing on the top of the composite block is a vessel 40 movable in ball-bearing guides 42 along axis X—X perpendicular to the interface; vessel 40 contains temperature-measuring means 41 with the sensitive end at the bottom of the vessel. Bearing and pressing on the cover 40a of the vessel 40 is the stem of a dial gauge 39 mounted on the bracket 38. The outer face of the specimen 31 is kept at a steady warm temperature $T_H$ and that of the wax slab at a steady lower temperature $T_C$ by boiling water in vessel 40 (FIG. 2) or vessel 35 in FIG. 3, and by ice vessel 35 (FIG. 2) or vessel 40 in FIG. 3 respectively. The temperatures are checked by means 37 and 41. In the latter figure the wax slab 32 overlaps the specimen 31 and if the specimen is porous they should be separated by a skirt 33 of very thin material. The specimen 31 is again of known thickness $l_s$; the conductivity $k_c$ of the wax is known but the thickness $l_c$ of the slab is a variable. The slab is initially too thick, the initial value of $l_c$ being so chosen—by calculation from the above formula—that with the given applied temperatures the temperature at the interface between slab and specimen will be above the melting point of the wax. It will be observed that in each case the wax is on the cooler side of the specimen. A layer of wax at the interface will melt and run away thus reducing the thickness of the slab, the reduction, which will be shown by continuous change of the dial gauge reading, will bring the interface nearer and nearer to the cold end of the composite block until the temperature at the interface reaches that of change of state of the wax. This will be detected by the dial gauge reading becoming steady and from this steady reading the thickness $l_c$ at temperature $T_M$ will be known. By substitution of the measured value in the above quoted formula the conductivity of the specimen could be found, but in practice the dial gauge can be calibrated to give a direct reading of conductivity. It will be seen that the dial gauge serves both as the means to detect when the wax surface is beginning to solidify and as the means to measure thickness at that moment.

We claim:
1. Apparatus for measuring the unknown thermal conductivity of a specimen, comprising:
   a bracket member;
   a datum block of known length and thermal conductivity contiguous with said bracket member;
   said datum block presenting at one end an exposed face for receiving a fusible adhesive and specimen of predetermined dimensions and at the other end a face exposed for heating;
   means on said bracket member for progressively heating the face at said other end of the datum block;
   means operatively associated with said other end of said datum block for selectively determining the temperature of said heated face;
   means on said bracket member for attachment to said specimen and for moving said specimen relative to said datum block when said adhesive reaches a predetermined temperature corresponding to the melting point thereof;
   said specimen moving means operatively associated with said temperature determining means for actuating said temperature determining means when said adhesive reaches said predetermined temperature.

2. Apparatus for measuring the unknown thermal conductivity of a specimen having known dimensions comprising:
   a support bracket member;
   a support block mounted on said bracket member;
   means mounted on said bracket for movement toward and away from the support block along a common axis;
   said movable member and said support block having opposed faces transverse to said axis and separated by a variable gap for receiving and holding a datum block and said specimen between said faces with an interface between said datum block and said specimen perpendicular to said axis;
   means operatively associated with said support block and with said movable means for maintaining said support block and said movable means at predetermined separate temperatures; and
   means mounted on said bracket member for urging said movable means towards said support block and for indicating the dimension of said gap in the direction of said axis when the temperature at said interface is equal to the melting point temperature of said datum block.

3. In the method of measuring the unknown thermal conductivity of a specimen of known size, in comparison with a datum block of known thermal conductivity, by causing heat to flow along a path which passes successively through specimen and datum block of determining the unknown conductivity from simultaneous values including the length $l_c$ of the path through the datum block and the temperature $T_H$ and $T_C$ at the end of the path, the steps of:
   connecting said datum block to said specimen by means of a layer of fusible material of known melting point $T_M$ (between $T_H$ and $T_C$) across the flow path at a known intermediate position;
   applying a force to said specimen tending to move said specimen relative to said datum block, said fusible layer resisting said relative movement;

heating a first end of said path to vary the quantity $T_H$;

cooling a second end of said path to maintain the temperature at $T_C$;

moving said specimen relative to said datum block in response to said force when the temperature of said fusible material reaches $T_M$; and actuating a $T_H$ indicator means in response to said movement when said fusible material temperature equals $T_M$ whereby the thermal conductivity of said specimen can be determined.

References Cited
UNITED STATES PATENTS

| | | | |
|---|---|---|---|
| 2,484,736 | 10/1949 | Razek | 73—15 |
| 2,503,593 | 4/1950 | Pearce et al. | 73—15 |

RICHARD C. QUEISSER, Primary Examiner

J. WHALEN, Assistant Examiner